United States Patent
Annequin et al.

(10) Patent No.: US 6,367,830 B1
(45) Date of Patent: Apr. 9, 2002

(54) STEERING KNUCKLE AND SUSPENSION MODULE

(75) Inventors: Thierry Annequin, Fleurines; Mustaphe Benotmane, Eaubonne; Olivier M. Derollepot, Paris; Thierry Frouin, Draveil; Andrew Herbert, Paris; Nicholas Jones, Rhuis, all of (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/504,566

(22) Filed: Feb. 15, 2000

(30) Foreign Application Priority Data

Mar. 15, 1999 (GB) .............................................. 9905745

(51) Int. Cl.$^7$ .......................... B60G 11/58; B60G 15/07; B62D 7/18
(52) U.S. Cl. .......................... 280/93.512; 280/124.145; 280/124.146; 280/124.154
(58) Field of Search ....................... 280/124.1, 124.125, 280/124.154, 124.155, 124.145, 124.146, 124.162, 124.164, 124.179, 93.51, 93.512

(56) References Cited

U.S. PATENT DOCUMENTS

| | | | | |
|---|---|---|---|---|
| 2,992,015 A | * | 7/1961 | Halford et al. | 280/124.146 |
| 3,493,242 A | * | 2/1970 | Nicholls | 280/124.154 |
| 3,703,215 A | * | 11/1972 | Takahashi | 280/124.146 |
| 4,223,903 A | * | 9/1980 | Grabb et al. | 280/124.145 |
| 4,274,654 A | * | 6/1981 | Travaglio | 280/124.159 |
| 4,545,601 A | * | 10/1985 | Muller et al. | 280/124.146 |
| 4,721,325 A | * | 1/1988 | Mackovjak et al. | 280/124.155 |
| 4,763,920 A | * | 8/1988 | Huidekoper | 280/124.146 |
| 4,923,209 A | * | 5/1990 | Armbrust et al. | 280/124.146 |
| 4,997,201 A | * | 3/1991 | Schaible | 280/124.145 |
| 5,192,100 A | * | 3/1993 | Rumpel et al. | 280/124.154 |
| 5,338,055 A | * | 8/1994 | Mauz | 280/93.512 |
| 5,868,409 A | * | 2/1999 | Breuer | 280/124.125 |
| 5,984,330 A | * | 11/1999 | Hasshi et al. | 280/124.146 |

FOREIGN PATENT DOCUMENTS

GB  1531177  11/1978

\* cited by examiner

*Primary Examiner*—Lanna Mai
*Assistant Examiner*—Ruth Ilan
(74) *Attorney, Agent, or Firm*—Robert M. Sigler

(57) ABSTRACT

A module (10) for a motor vehicle comprising a suspension strut (12) including an outer tubular housing (16) for a hydraulic damper (24) and a spring seat (18); and a steering knuckle (14); wherein the housing, the spring seat and the steering knuckle are formed as an integral one-piece assembly. Reduces assembly complexity, time and cost.

8 Claims, 3 Drawing Sheets

STEERING KNUCKLE AND SUSPENSION MODULE

TECHNICAL FIELD

The present invention relates to a module for a motor vehicle which includes a steering knuckle and a suspension strut.

BACKGROUND OF THE INVENTION

In a motor vehicle, it is usual practice to assemble the corner module of the vehicle from separately formed components of suspension strut, steering knuckle, brake caliper, wheel bearing, and other components. The suspension strut includes an outer tubular housing for a hydraulic damper, with a lower spring seat, a mounting bracket, and a stabiliser bar bracket mounted on the housing. A coil spring is positioned between the lower spring seat and an upper mounting assembly. The mounting bracket is used to attach the hydraulic damper to the steering knuckle. This known arrangement has disadvantages associated with assembly of the corner module and manufacture of the components, because of the need for accurate interface connections.

SUMMARY OF THE INVENTION

It is an object of the present invention to overcome the above mentioned disadvantages.

A module in accordance with the present invention for a motor vehicle comprises a suspension strut including an outer tubular housing for a hydraulic damper and a spring seat; and a steering knuckle; wherein the housing, the spring seat and the steering knuckle are formed as an integral one-piece assembly.

The module of the present invention provides a reduction in assembly complexity, time and costs by removing the need to provide accurate interface between the housing of the suspension strut and the steering knuckle.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
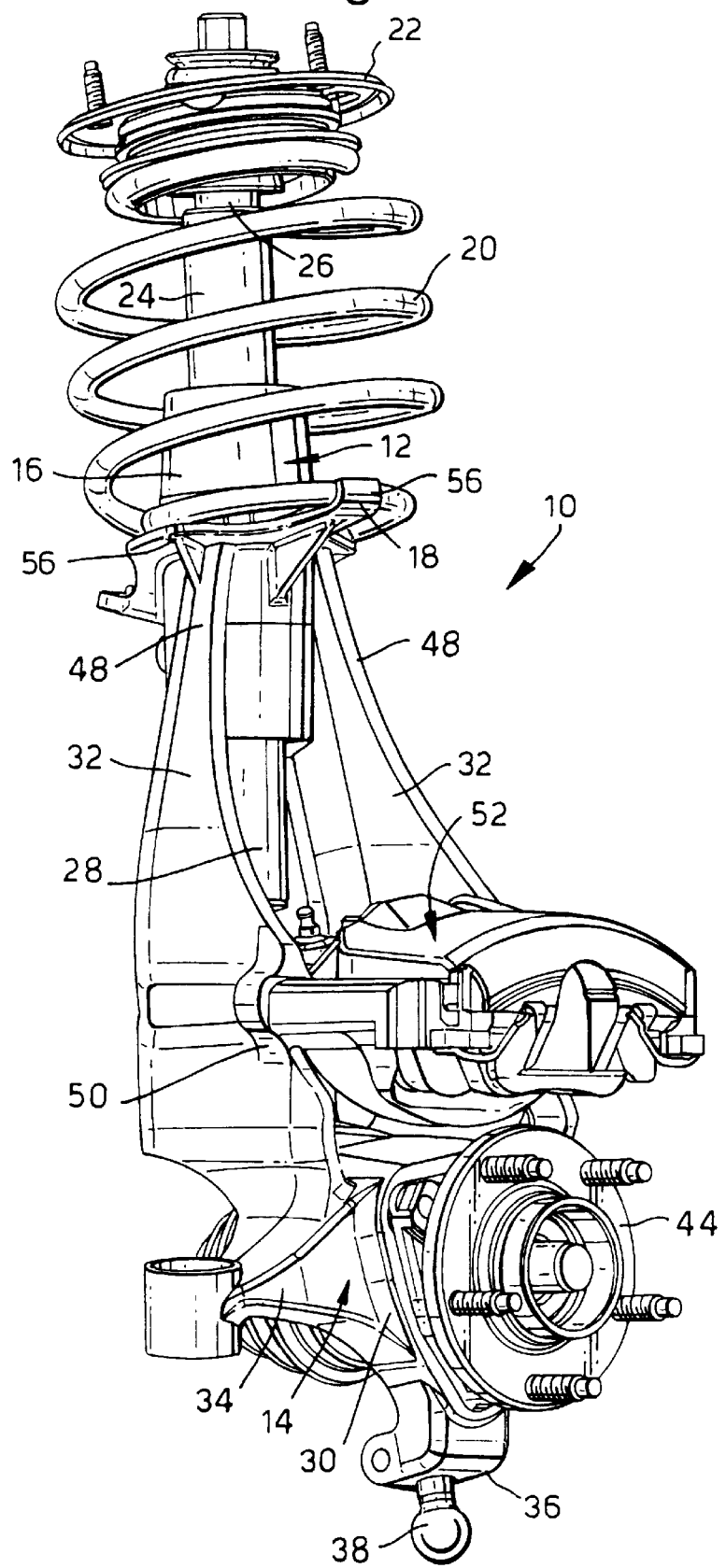
FIG. 1 is a perspective view, from one side, of a module in accordance with the present invention, with other components attached to the module.
Figure 2:
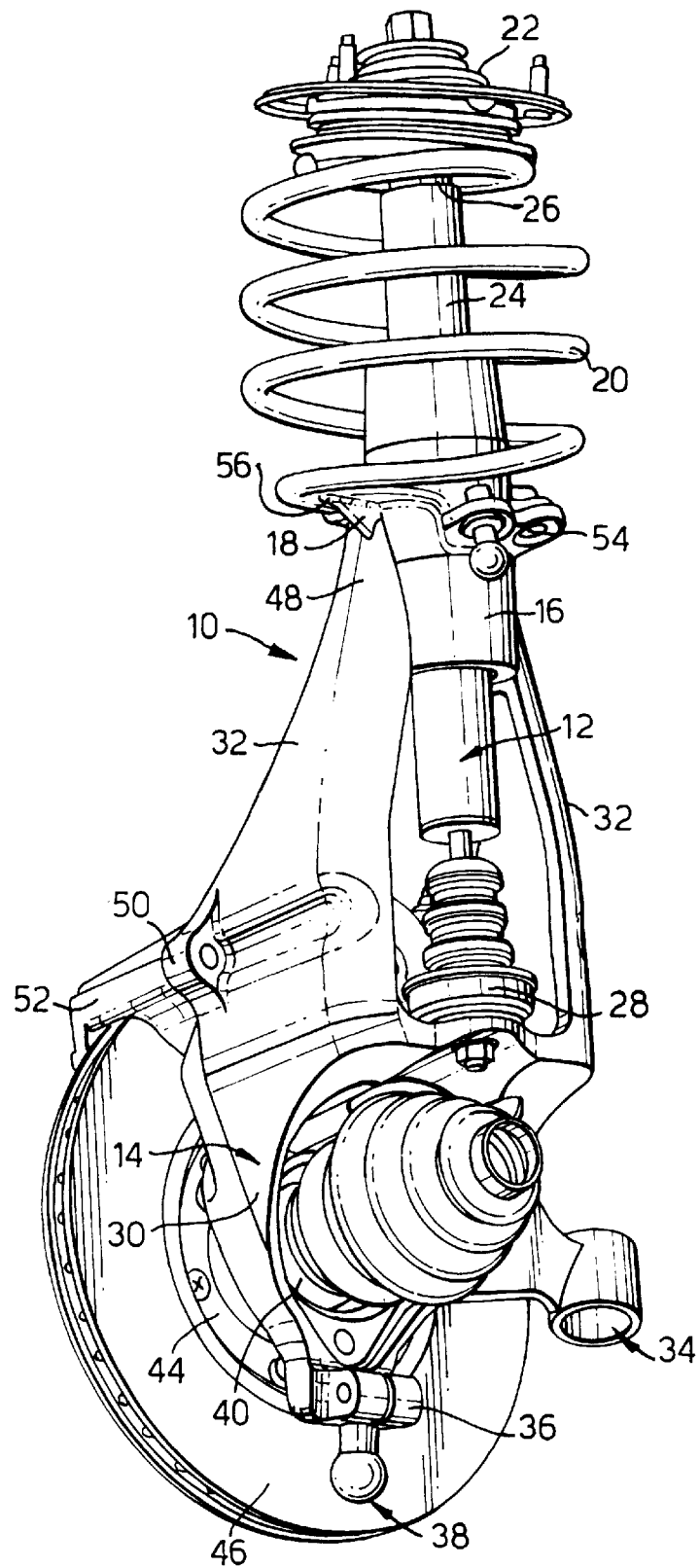
FIG. 2 is a perspective view of the module of FIG. 1 from the other side with a brake disc in position.
Figure 3:
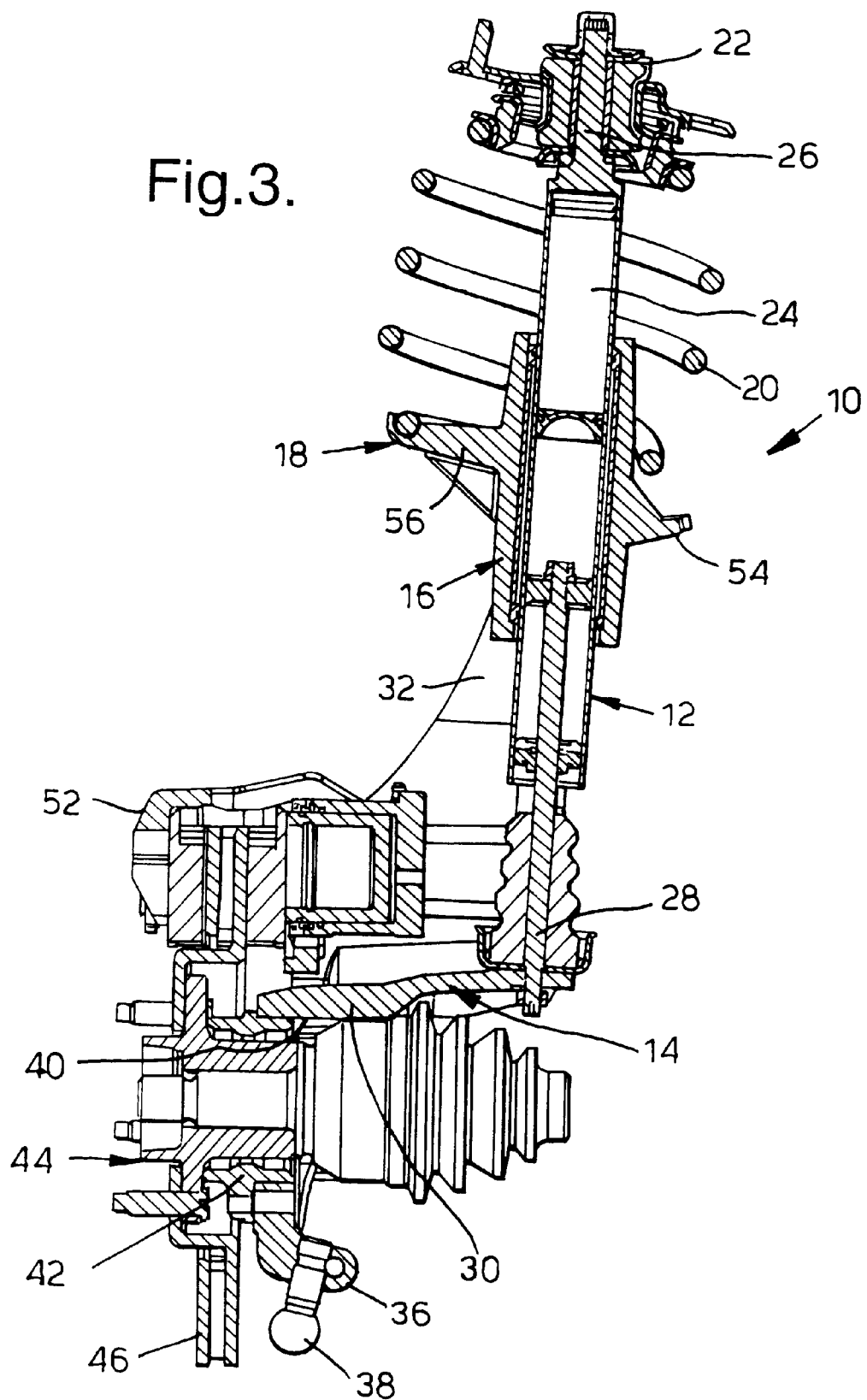
FIG. 3 is a cross-sectional view of the module of FIGS. 1 and 2.

Referring to the drawings, the module 10 in accordance with the present invention is for mounting in a motor vehicle (not shown). The module 10 includes a suspension strut 12 and a steering knuckle 14. The suspension strut 12 includes a substantially tubular housing 16 and a lower spring seat 18 for a coil spring 20 associated with the suspension strut. A combined upper spring seat and mounting assembly 22 is attached to the suspension strut 12 for securing the strut to the chassis (not shown) of the motor vehicle in the usual manner. In the present embodiment, the suspension strut 12 includes a monotube hydraulic damper 24, with the housing 16 supporting or defining the tube of the damper. The upper end 26 of the damper 24 is attached to the mounting assembly 22 and the lower end 28 of the damper is attached to the steering knuckle 14. In an alternative embodiment, the suspension strut may include a twin tube hydraulic damper, with the housing 16 supporting or defining the outer tube of the damper.

The steering knuckle 14 includes a main body 30 and a pair of arms 32 extending between the main body and the housing 16 of the suspension strut 12. The upper ends 48 of the arms 32 are attached to the housing 16 on opposed sides thereof. In the alternative arrangement of having a twin tube damper as part of the suspension strut, the pair of arms 32 may be replaced by a single arm. The steering knuckle 14 also includes a steering ball joint arm 34 and a bracket 36 for a lower control arm ball joint 38. The ball joint arm 34 and the bracket 36 are integral with the main body 30 in the usual manner. The main body 30 is substantially annular and has an aperture 40 for receiving a wheel bearing 42 attached to a wheel hub 44 and brake disc 46 in the usual manner. The steering knuckle 14 includes a brake mounting bracket 50 for the mounting of a hydraulic brake caliper 52, as shown, or an electrically operated brake (not shown). The brake mounting bracket 50 is preferably positioned substantially diametrically opposite to the bracket 36 for the lower control arm ball joint 38.

A stabiliser bar bracket 54 is attached to the housing 16 of the suspension strut 12.

In accordance with the present invention, the housing 16 and the lower spring seat 18 of the suspension strut 12; and the main body 30 and the arm or arms 32 of the steering knuckle 14, are formed integrally in one piece, preferably by casting from aluminium or aluminium alloy. Where two arms 32 are present, the arms preferably have a substantially L-shaped cross-section for rigidity and strength, with the lower end 28 of the hydraulic damper 24 extending between the arms and being attached to the main body 30 of the steering knuckle 14. The spring seat 18 preferably comprises three of more fingers 56 which extend radially outwards from the housing 16. The stabiliser bar bracket 54 is preferably integrally formed with the housing 16. In an alternative arrangement, the brake mounting bracket 50 may be omitted and the hydraulic brake caliper 52 may have a caliper housing, not shown, which is integrally formed with the housing 16, spring seat 18, main body 30 and arm or arms 32.

The present invention allows for a reduction in the number of parts for forming the module 10 with reduced assembly complexity, validation and assembly time, and cost. The integration of the steering knuckle and the suspension strut housing reduces stresses and provides higher stiffness at the interface between the knuckle and housing when compared to known arrangements. The preferred use of aluminium or aluminium alloy provides a mass reduction compared to known steel arrangements. The preferred positioning of the hydraulic brake caliper 52 provides improved heat dissipation, and allows a reduction in size for the brake mounting bracket 50 compared to previously known arrangements.

What is claimed is:

1. A module for a motor vehicle comprising a suspension strut including an outer tubular housing for a hydraulic damper, a suspension spring seat, and a steering knuckle; wherein the housing, the suspension spring seat, and the steering knuckle comprise an integral, one-piece casting and the steering knuckle is integrally connected to the housing of the suspension strut by at least two arms, the two arms being attached to the housing on opposite sides of the housing.

2. A module as claimed in claim 1, wherein the one-piece casting comprises aluminium or aluminium alloy.

3. A module as claimed in claim 1, wherein the arms have a substantially L-shaped cross-section.

4. A module as claimed in claim 1, wherein the spring seat comprises at least three fingers extending radially from the housing.

5. A module as claimed in claim 1, wherein the steering knuckle includes a brake mounting bracket.

6. A module as claimed in claim 5, wherein the steering knuckle includes an annular main body with a bracket for a lower control arm ball joint, wherein the bracket is positioned substantially radially opposite the brake mounting bracket, and with a steering ball joint arm.

7. A module as claimed in claim 5, wherein the steering knuckle includes an annular main body with a bracket for a lower control arm ball joint, wherein the bracket is positioned substantially radially opposite the brake mounting bracket, and wherein a stabiliser bar bracket is integrally formed on the housing.

8. A module as claimed in claim 1, wherein a stabiliser bar bracket is integrally formed on the housing.

* * * * *